United States Patent
Lee et al.

(10) Patent No.: US 9,442,632 B2
(45) Date of Patent: *Sep. 13, 2016

(54) APPARATUS AND METHOD FOR INFORMATION DISPLAY OF PORTABLE DEVICE

(71) Applicant: Samsung Electronics Co., Ltd., Gyeonggi-do (KR)

(72) Inventors: Chang Woo Lee, Gyeongsangbuk-do (KR); Won Kyung Seong, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 195 days.

This patent is subject to a terminal disclaimer.

(21) Appl. No.: 14/255,194

(22) Filed: Apr. 17, 2014

(65) Prior Publication Data

US 2014/0215395 A1    Jul. 31, 2014

Related U.S. Application Data

(63) Continuation of application No. 12/703,902, filed on Feb. 11, 2010, now Pat. No. 8,713,447.

(30) Foreign Application Priority Data

Mar. 3, 2009    (KR) .................. 10-2009-0018017

(51) Int. Cl.
*G06F 3/0482* (2013.01)
*G06F 9/44* (2006.01)
*H04M 1/725* (2006.01)

(52) U.S. Cl.
CPC ............. *G06F 3/0482* (2013.01); *G06F 9/442* (2013.01); *G06F 9/4418* (2013.01); *H04M 1/72563* (2013.01); *H04M 1/72583* (2013.01); *H04M 2250/22* (2013.01)

(58) Field of Classification Search
CPC ..... G06F 3/0482; G06F 9/4401; G06F 9/442
See application file for complete search history.

(56) References Cited

U.S. PATENT DOCUMENTS

| | | |
|---|---|---|
| 5,600,766 A | 2/1997 | Deckys et al. |
| 6,373,498 B1 | 4/2002 | Abgrall |
| 6,590,590 B1 | 7/2003 | Wen et al. |
| 6,791,572 B1 | 9/2004 | Cloney et al. |
| 6,993,645 B2 | 1/2006 | Joseph et al. |
| 7,073,051 B2 | 7/2006 | Touchet |
| 7,165,223 B2 | 1/2007 | Kutaragi et al. |
| 7,231,434 B2 | 6/2007 | Raghunandan |
| 7,506,144 B2 | 3/2009 | Zhao et al. |
| 7,640,425 B2 | 12/2009 | Kasuga |
| 7,885,999 B2 | 2/2011 | St Marie |
| 2002/0073305 A1 | 6/2002 | Joseph et al. |
| 2002/0116386 A1 | 8/2002 | Fabri et al. |
| 2003/0122864 A1 | 7/2003 | Jenne et al. |

(Continued)

FOREIGN PATENT DOCUMENTS

JP    2004-037705 A    2/2004

*Primary Examiner* — Nicholas Ulrich
(74) *Attorney, Agent, or Firm* — Cha & Reiter, LLC.

(57) ABSTRACT

Provided is a method of displaying information of a portable device, which includes receiving a signal of booting or termination of the portable device; and displaying a valid information which is previously set while the booting or termination process is performing.

19 Claims, 5 Drawing Sheets

(56) References Cited

U.S. PATENT DOCUMENTS

| | | |
|---|---|---|
| 2003/0221093 A1 | 11/2003 | Touchet |
| 2004/0130557 A1* | 7/2004 | Lin ....................... G06F 9/4401 345/619 |
| 2006/0190357 A1 | 8/2006 | Fuchs et al. |
| 2006/0236081 A1* | 10/2006 | Hung .................... G06F 9/4401 713/1 |
| 2007/0022282 A1 | 1/2007 | Chang |
| 2008/0010447 A1 | 1/2008 | Liao |
| 2008/0046613 A1 | 2/2008 | Lai et al. |
| 2009/0013060 A1 | 1/2009 | St Marie |
| 2009/0019384 A1 | 1/2009 | Chien |

\* cited by examiner

APPARATUS AND METHOD FOR INFORMATION DISPLAY OF PORTABLE DEVICE

CROSS REFERENCE TO RELATED APPLICATIONS

The present application is a Continuation of U.S. patent application Ser. No. 12/703,902 filed on Feb. 11, 2010, which claims priority to an application entitled "Apparatus and Method for Information Display of Portable Device" filed in the Korean Intellectual Property Office on Mar. 3, 2009 and assigned Serial No. 10-2009-0018017, the entire disclosure of which is hereby incorporated by reference.

BACKGROUND

1. Field of the Invention

The present invention relates to a method and apparatus for displaying information of a portable device, and more particularly, to a method and apparatus for displaying valid information of a portable device according to a previous setting.

2. Description of the Related Art

A portable device has become a vital part of modern day life for providing various data transmission function and voice call function. For example, the portable device can provide a digital broadcast reception function, a wireless internet function, a short message service function, a schedule management function, and a menu function. In particular, as the memory and CPU technology are advancing, the portable device can provide more functions. At the same time, a firmware which is software for operation of portable device has become complicated, and capacity of firmware also has been increased. Accordingly, the booting and termination process of portable device requires tens seconds to several minutes. Users can be bored of such a lengthy booting and termination process. Accordingly, a method and apparatus which can utilize the booting and termination process time of portable device to the advantages of users are required.

SUMMARY

The present invention is made in view of the above problems and provides additional advantages, by providing a method and apparatus for outputting a preset valid information during a booting and termination of portable device.

In accordance with an aspect of the present invention, a method of displaying information of a portable device includes receiving a signal of booting or termination of the portable device; and in response to the booting or termination signal, displaying a valid information which is previously set while the booting or termination process is performing.

In accordance with another aspect of the present invention, an apparatus for displaying information of a portable device includes an input unit which generates a signal of booting or termination of the portable device; a controller which controls to output valid information that is previously configured in response to the booting or termination signal; a display unit which outputs the valid information under the control of the controller while the booting or termination of the portable device is performing; and a storage unit which stores the valid information.

BRIEF DESCRIPTION OF THE DRAWINGS

The above features, and advantages of certain exemplary embodiments of the present invention will be more apparent from the following description taken in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Note that the following disclosure is provided for exemplary purposes only and is not intended as a limitation of the present invention. Furthermore, all alternate embodiments which are obvious modifications of this disclosure are intended to be encompassed within the scope of the present invention.

Hereinafter, "booting" refers to turning the power of portable device on, and "termination" refers to turn the power of portable device off.

Hereinafter, "valid information" refers to information which is previously configured or set to output through a display unit during the booting or the termination.

Figure 1:
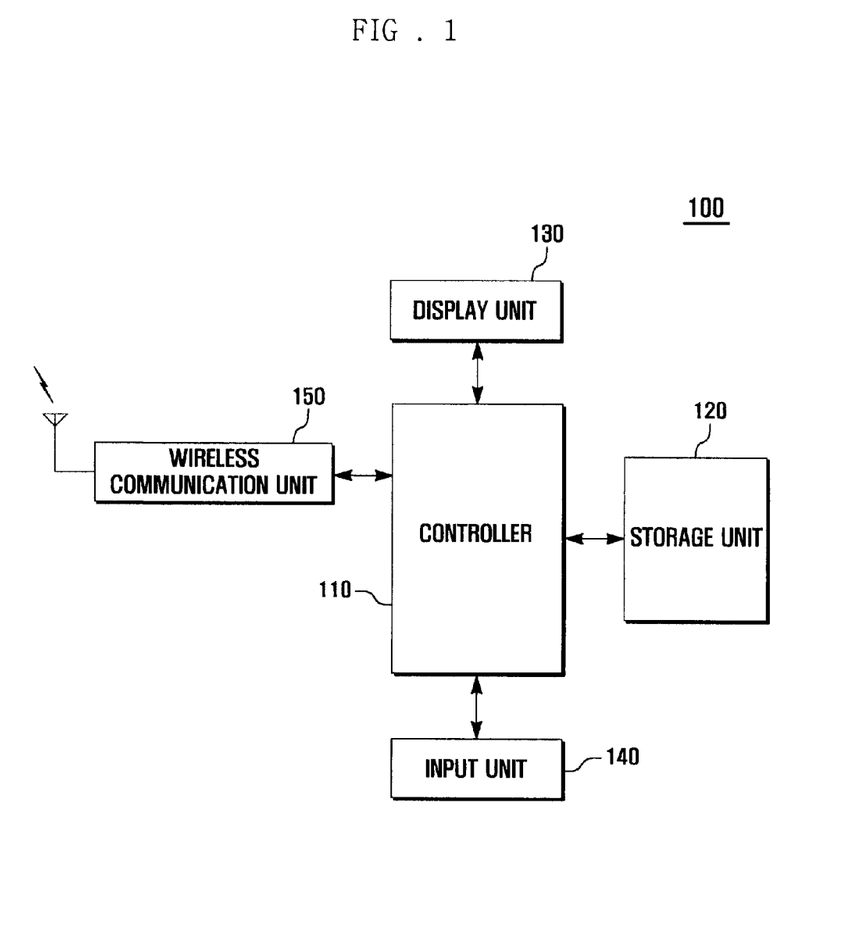
FIG. 1 schematically illustrates a configuration of a portable device according to an exemplary embodiment of the present invention.
Figure 2:
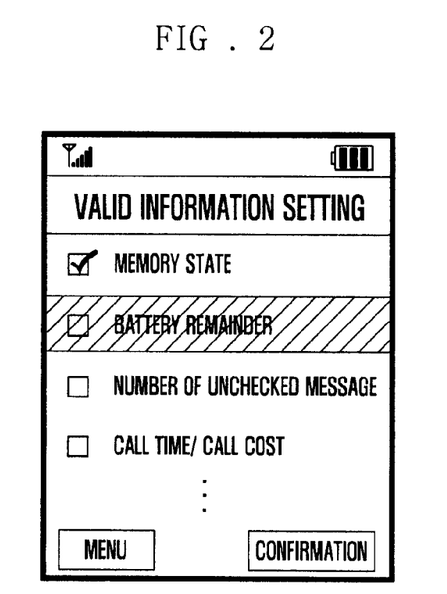
FIG. 2 is a screen illustrating a valid information setting menu according to an exemplary embodiment of the present invention.
Figure 3:
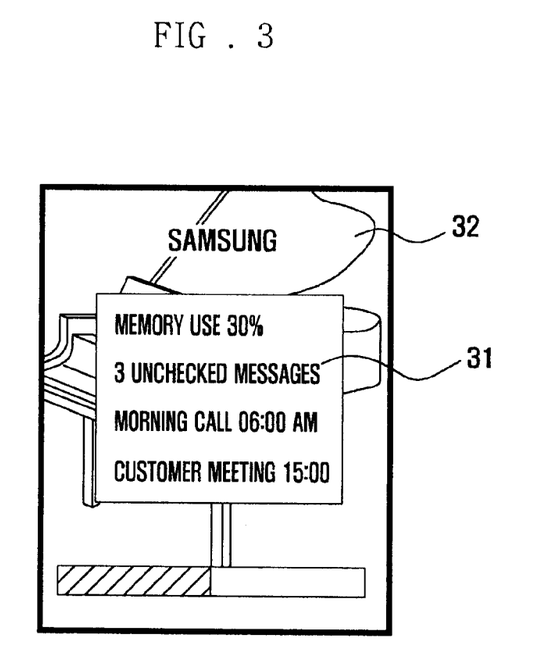
FIG. 3 is a screen of outputting valid information in a booting process according to an exemplary embodiment of the present invention.

FIG. 1 is a block diagram schematically illustrating a configuration of a portable device according to an exemplary embodiment of the present invention, FIG. 2 is a screen illustrating a valid information setting menu according to an exemplary embodiment of the present invention, and FIG. 3 is a screen of outputting valid information in a booting process according to an exemplary embodiment of the present invention.

Referring to FIGS. 1 to FIGS. 3, the portable device 100 according to an exemplary embodiment of the present invention includes a controller 110, a storage unit 120, a display unit 130, an input unit 140, and a wireless communication unit 150.

The portable device 100 of the present invention can control to output a preset valid information during the booting or termination of the portable device 100.

In operation, the wireless communication unit 150 transmits and receives a signal under the control of the controller 110. To this end, the wireless communication unit 150 may include a radio frequency transmitter (not shown) which up-converts and amplifies a frequency of a transmitted signal and a radio frequency receiver (not shown) which low-noise amplifies and down-converts a received signal.

The wireless communication unit 150 can also receive and transmit a text message under the control of the controller 110.

The input unit 140 can include a plurality of input keys and function keys which receive an input of numeric or character information and set various functions. Moreover, the input unit 140 can generate a key signal which is inputted according to the user setting and function control. In particular, the input unit 140 of the present invention can generate at least one of a booting signal of the portable device 100, a termination signal of the portable device 100, and an input signal for setting information to be displayed during the booting or the termination of the portable device 100, e.g., battery remainder, the number of unchecked message, call time, estimated call cost, memory state, morning call information, alarm information, anniversary information and schedule information, etc. Such an input unit 140 can be configured with a touch-pad, a touch screen, a button type key pad having a normal key arrangement, and a button type key pad of qwerty type or any combination thereof.

The display unit 130 can display not only a screen according to various functions of the portable device 100 (e.g., standby screen, menu screen, file play screen, and call screen) but also a user data inputted by the user, a function setting information or various information to be provided to the user. The display unit 130 can be configured of LCD (Liquid Crystal Display), or OLED (Organic Light-Emitting Diode). In case the display unit 130 is provided with a touch screen, the display unit 130 can perform the function of input unit 140. Particularly, the display unit 130 of the invention can display a valid information setting menu screen. For instance, the display unit 130 can output the valid information setting screen like FIG. 2 in case a valid information setting menu is activated under the control of the controller 110. Thereafter, a user can select a valid information desired to be outputted during the next booting or termination of portable device 100 using the input unit 140. For instance, the display unit 130 can output items corresponding to features such as battery remainder, the number of unchecked message, call time, estimated call cost, morning call information, anniversary information and schedule information, or any combination thereof as a list type. Here, the display unit 130 can display any one item with a highlight. From the list type, a user can move the highlight and input a confirmation key signal using the input unit 140 to select the item which is to be set/saved as valid information. That is, a user can select a number of desired features from the list to be shown during the booting or termination of the portable device 100, so that the user can use one of these features instead of just waiting to boot or terminate. The selected features are saved as "valid information". If the display unit 130 is provided with a touch screen, a user can select item to be set as the valid information through touching.

The display unit 130 can output a valid information, which is previously set, during the booting or termination of the portable device 100 the control of the controller 110. Moreover, the display unit 130 further outputs a preset start image in the booting, and can output a preset termination image in the termination of the portable device 100. Note that the start image and the termination image can be still image or video image. For instance, as shown in FIG. 3, the display unit 130 can output a start image 32 under the control of the controller 110. Here, the display unit 130 can output a memory state, the number of unchecked message, morning call information, schedule information, etc., which are previously set, in a valid information display window 31.

Before the booting of the portable device 100 is completed, a user can identify the valid information through the valid information display window 31 outputted to the display unit 130. Then, the display unit 130 can output a preset stand-by screen or further output the valid information for a preset time if the booting process of the portable device 100 is completed.

The storage unit 120 can store an application program necessary for the operation of the function of the portable device 100 and for performing the overall operation of the portable device 100, for example, an application program necessary for the operation of above-described elements, i.e., wireless communications unit 150, input unit 140 and display unit 130 and an operating system (OS) which boots the portable device 100. Moreover, the storage unit 120 can store data generated according to the use of the portable device 100. This storage unit 120 can include a program area and a data area.

The program area stores an application program necessary for other options of the portable device 100, e.g., the sound play function, and the image or video image play function. Particularly, the program area of the present invention can store an application program (hereinafter, valid information setting program) for the setting of valid information.

The valid information setting program can output item (e.g., battery remainder, unchecked message, call time, estimated call cost, memory state, morning call information, alarm information, anniversary information, schedule information, and other information provided by the portable device, or any combination thereof) that can set be as valid information in the activation of valid information setting menu, as a list type so that a user can select the desired feature(s) from the valid information. Thereafter, the valid information can be outputted to the display unit 130 in the booting or the termination of the portable device 100 based on the selected features. Note that time when the valid information is outputted to the display unit 130 and the type of the valid information, can be specifically specified by the user. Further, format by which the valid information is displayed can be selectively changed by format designed by designer or user's setting The data area is an area where data generated according to the use of portable device 100 are stored, and can store a text message received through the wireless communications unit 150, schedule information that user inputs, alarm, morning call, anniversary, start image and termination image. Particularly, data area according to a preferred embodiment of the present invention can be stored a preset valid information. The valid information can be periodically updated or can be updated when performing the termination process of the portable device 100. Such updating is performed to output a recent valid information in the booting of the portable device 100. It is preferable that such valid information is stored in an area (hereinafter, booting information storage area) which can be preferentially accessed in the activation of the operating system of the portable device 100, i.e., in the performance of the booting process.

The controller 110 can control the overall operation of the portable device 100 and a signal flow between the internal blocks of the portable device 100. That is, when power is supplied, the controller 110 can control the booting process of the portable device 100, supply power necessary for the activation of above-described each element and initialize each element. Moreover, the controller 110 can perform the termination process such as data backup when inputting a termination command signal. A time of tens seconds to several minutes are required for the booting and termination process.

The controller 110 can control to output a preset start image or termination image for the booting or termination time. Particularly, as shown in FIG. 2, the controller 110 can control to output menu screen for the setting of the valid information from the input unit 140 when receiving an input signal for activating the valid information setting menu. Then, the controller 110 sets items selected by the user as a valid information and can store it in the storage unit 120. The valid information includes at least one of battery remainder, number of unchecked message, call time, estimated call cost, memory state, morning call information, alarm information, anniversary information and schedule information, or any combination thereof, and can be stored in the booting information storage area which is accessed when performing the booting process.

The controller 110 can control to output a preset valid information in the booting or the termination of the portable device 100. That is, the controller 110 can control to extract the valid information (e.g., battery remainder, number of unchecked message, call time, schedule information, memory state, and morning call information or the like) from the storage unit 120 in the booting or the termination of the portable device 100, and outputs the extracted valid information to the display unit 130.

The controller 110 can periodically update the valid information. This is to prevent outputting inappropriate valid information in the booting of the portable device as valid information is not updated in case power is blocked without the termination process, that is, in case battery is compulsorily separated. Moreover, the controller 110 can hold the termination process during the termination process of the portable device 100 for a certain time and then update the valid information. Here, the controller 110 can control to convert the updated valid information to one of image format or text format and store it. Moreover, the controller 110 can control to superpose the converted image or text upon a preset start image or termination image for storage.

The controller 110 can output a preset stand-by screen in the completion of booting by checking whether booting is completed. Alternatively, the controller 110 can control to further output the valid information for a preset time after the booting is completed. That is, user can select information required for checking among the valid information and check details after the completion of the booting of the portable device 100. For example, if a user selects the unchecked message among the valid information, the controller 110 can control to output a screen which can check the unchecked message.

Moreover, although not shown, the portable device 100 can selectively further include elements having a supplementary function such as a camera module for image or video image photographing, a broadcasting reception module for the reception of broadcasting, an audio signal output unit like speaker, a voice signal input apparatus like microphone, and a digital sound play module like MP3 module. Such elements can be variously varied due to the trend of the convergence of the digital device so that it cannot be enumerated in detail, but the portable device 100 can further include elements equivalent to the above mentioned elements.

In the above, the information display unit of the portable device according to an exemplary embodiment of the present invention was illustrated with reference to a block diagram of portable device and an exemplary screen. Hereinafter, the valid information setting method of the portable device and the information display method of the portable device according to an exemplary embodiment of the present invention will be illustrated.

Figure 4:
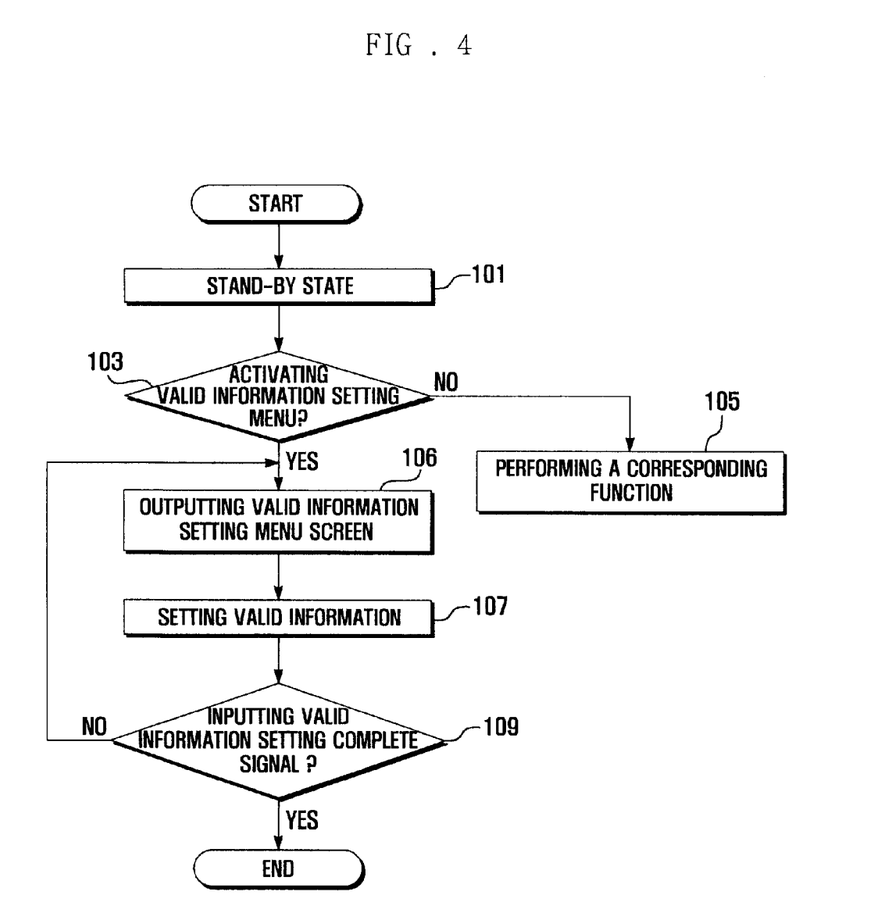
FIG. 4 is a flowchart illustrating a valid information setting method of a portable device according to an exemplary embodiment of the present invention.

FIG. 4 is a flowchart illustrating a valid information setting method of a portable device according to an exemplary embodiment of the present invention.

Referring to FIG. 4, the controller 110 can be a standby state which performs the booting process of the portable device 100 when power is supplied and outputs a preset stand-by screen to the display unit 130 (101).

When an input signal is received from the input unit 140, the controller 110 can check whether a corresponding input signal is for activating the valid information setting menu (103). If not an input signal for activating the valid information setting menu at step 103, the controller 110 can perform a corresponding function according to the input signal (105). For example, the controller 110 can perform the call function, the message writing function, the video playing function or the like. On the other hand, if the input signal is for activating the valid information setting menu at step 103, the controller 110 can output the valid information setting menu screen to the display unit 130 (106).

The controller 110 can set a valid information to be outputted to the display unit 130 when performing the booting or termination process of the portable device 100 according to a user's input (107). For example, the controller 110 can control to output a plurality of items which can be set as valid information, e.g., battery remainder, number of unchecked message, call time, estimated call cost, memory state, morning call information, alarm information, anniversary information and schedule information, to the display unit 130 as a list type. By using the input unit 140, a user can select at least one specific item of the plurality of items and can set as the valid information, which can be preconfigured according to a user's preference and displayed to the user during booting or termination.

The controller 110 can check the input of a valid information setting complete signal (109). In case the valid information setting complete signal is not inputted at step 109, the controller 110 can control to return to step 106, and to perform the next processes as described above. On the other hand, in 109 step, in case the valid information setting complete signal is inputted at step 109, the controller 110 can control to store items which are set as valid information in the storage unit 120 according to the user's selection. It is preferable that such valid information is stored in the booting information storage area so as to be outputted to the display unit 130 when subsequent booting or termination of the portable device. Moreover, the valid information can be updated at a certain period or can be updated and stored when performing the termination process of portable device 100. Here, the updated valid information can be converted into at least one of image format or text format, then stored under the control of the controller 110. Moreover, the controller 110 can control to superpose the converted image or text on a preset start image or termination image and store it. In an alternate embodiment, the valid information can be pre-set and stored when manufacturing a portable device.

Figure 5:
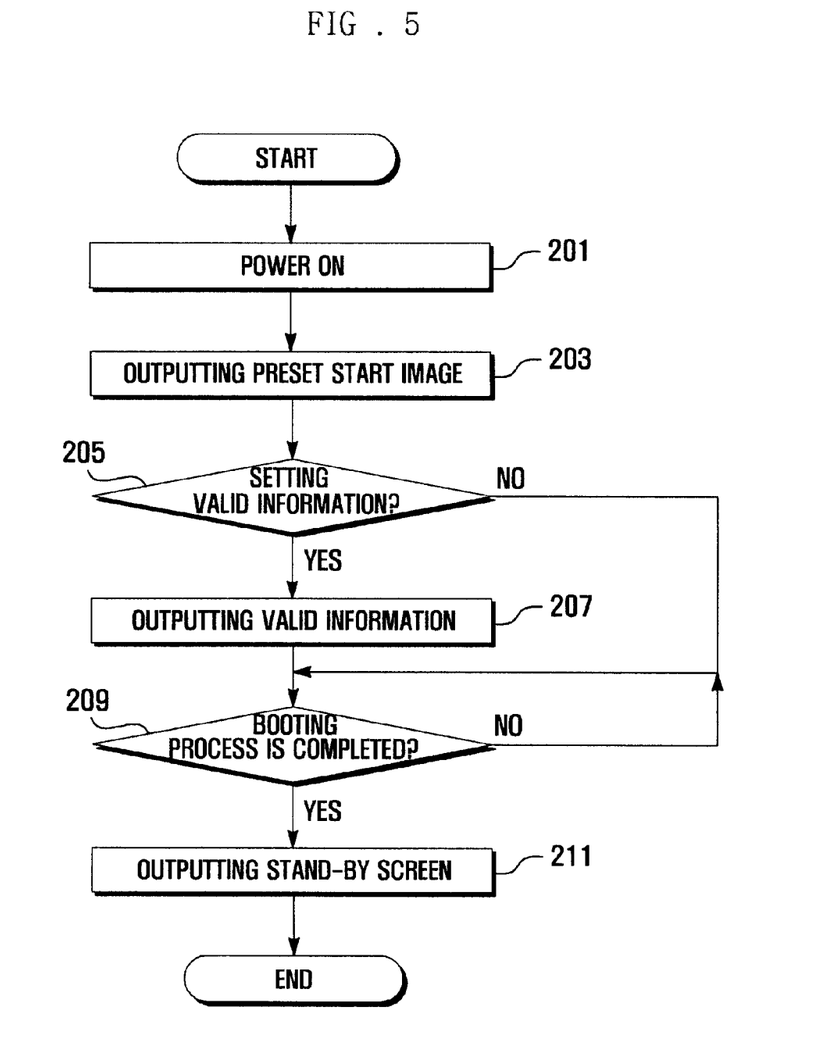
FIG. 5 is a flowchart illustrating a information display method of a portable device in a booting process according to an exemplary embodiment of the present invention.

FIG. 5 is a flowchart illustrating a information display method of a portable device in a booting process according to an exemplary embodiment of the present invention.

Referring to FIG. 5, the controller 110 can be turned on due to a power key signal input or as a power key signal is inputted during a specific time (201). Then, the controller 110 can control to output a preset start image to the display unit 130 (203). The start image can be set as a still image or a video image.

The controller 110 can check whether a preset valid information exists (205). The valid information can include at least one of battery remainder, number of unchecked message, call time, estimated call cost, memory state, morning call information, alarm information, anniversary information and schedule information. If the valid information exists at step 205, the controller 110 can control to output the valid information to the display unit 130 with start image (207). On the other hand, in case valid information does not exist at step 205, the controller 110 can proceed to step 209.

The controller 110 checks whether the booting process is completed (209) and can maintain step 209 in case the booting process is not completed. On the other hand, in case the booting process is completed, the controller 110 can control to output a preset stand-by screen (211).

In the above, it is illustrated that stand-by screen is outputted after the booting is completed, but the present invention is not limited to this. That is, the present invention can further output the valid information for a certain time after the completion of booting. This is to allow a user to immediately check any one of the valid information after the booting. For example, if the user selects unchecked message among valid information, the controller 110 can control to output screen which can check the unchecked message to display unit 130.

Figure 6:
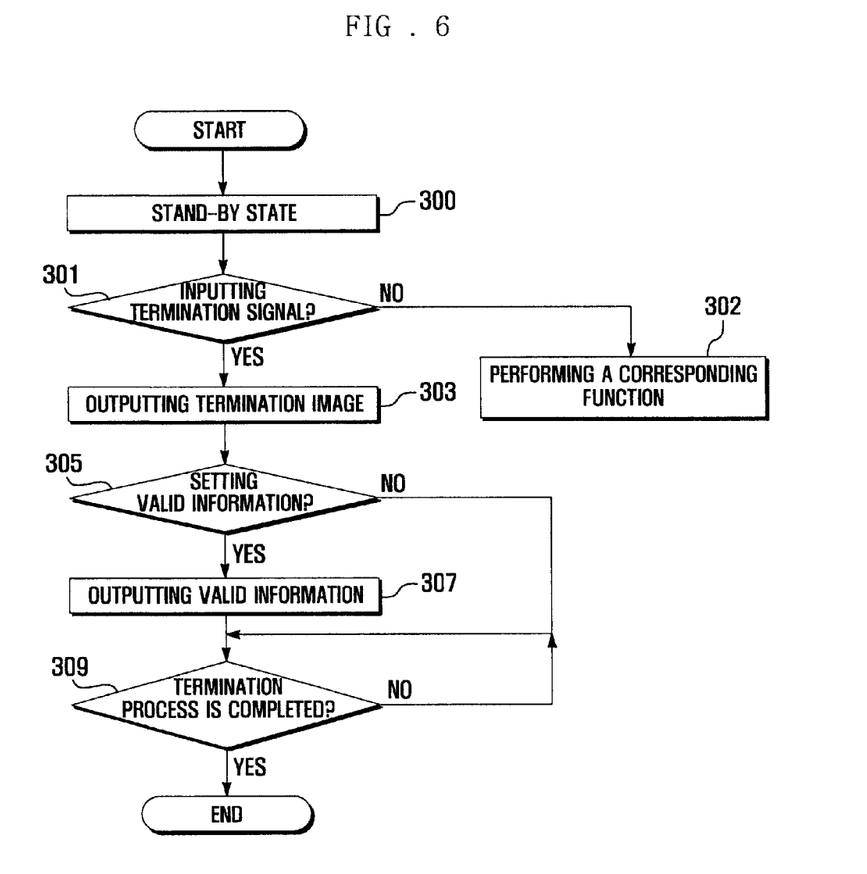
FIG. 6 is a flowchart illustrating a information display method of a portable device in a termination process according to an exemplary embodiment of the present invention.

FIG. 6 is a flowchart illustrating a information display method of a portable device in a termination process according to an exemplary embodiment of the present invention.

Referring to FIG. 6, the portable device 100 of the present invention can be a standby state which outputs a preset stand-by screen to display unit 130 (300). The controller 110 can check whether a termination signal is inputted (301). The termination signal can be generated as a user presses/activates a power key.

In case termination signal is not inputted at step 301, the controller 110 can perform a corresponding function (302). For example, according to the user's request, the controller 110 can perform the call function, the message writing function, the video play function or the like. On the other hand, in case termination signal is inputted at step 301, the controller 110 can control to output a preset termination image (303). The termination image can be set as still image or video.

The controller 110 can check whether a preset valid information was existed (305). The valid information can include at least one of battery remainder, number of unchecked message, call time, estimated call cost, memory state, morning call information, alarm information, anniversary information and schedule information. In case the valid information exists at step 305, the controller 110 can control to output the valid information to display unit 130 with the termination image (307). On the other hand, in case the valid information does not exist at step 305, the controller 110 can proceed to step 309.

The controller 110 can check whether the termination process is completed (309), and can maintain in case the termination process is not completed. On the other hand, in case the termination process is completed, the controller 110 can control to block power supply.

In the meantime, although not shown in FIG. 6, the controller 110 can update and store the valid information when performing the termination process of the portable device 100. In this case, the information display method of portable device 100 can further include the process of checking whether the storage of the valid information is completed in the termination process.

Moreover, the portable device 100 can convert the valid information into at least one of image format or text format and store it. The converted image or text can be stored while being overlapped with preset start image or termination image.

Moreover, in the above, it is illustrated that the same valid information is outputted in the booting and termination of the portable device 100, but the present invention is not limited to this. That is, the present invention can differently set the valid information which is outputted in the booting and termination of the portable device 100. Moreover, the present invention outputs the valid information at least one of the booting and termination of the portable device 100.

As described in the above, the information display method and apparatus of the portable device outputs a preset valid information, which has been pre-configured, so that a user can utilize time more efficiently while waiting for the booting or termination of portable device. Accordingly, it can further provide more convenience to a user.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of displaying information in a portable device, the method comprising:
obtaining information pertaining to functions of the portable device, the information comprising first information to be displayed during booting of the portable device and second information to be displayed during terminating of the portable device; and displaying the first information on a display unit of the portable device during the booting of the portable device, wherein the first and second information are preset by:

outputting a plurality of items corresponding to the functions of the portable device on the display unit;

selecting, via an input unit of the portable device, at least one item of the plurality of items to be set as the first information; and separately selecting, via the input unit, at least one item of the plurality of items to be set as the second information.

2. The method of claim 1, further comprising displaying the first information for a preset time period after the booting of the portable device is completed;

selecting one of the displayed first information on the display unit; and displaying a screen for checking the selected information on the display unit.

3. The method of claim 1, further comprising at least one of:

updating the information periodically; and updating the information when performing the terminating of the portable device.

4. The method of claim 1, further comprising:

storing the information in a storage area accessible during the booting of the portable device.

5. The method of claim 1, further comprising:

converting and storing the information into one of image format and text format.

6. The method of claim 5, wherein the converting comprises superposing the first information converted into one of image format and text format with a start image outputted when performing the booting or superposing the second information converted into one of image format and text format with a termination image outputted when performing the termination.

7. The method of claim 6, wherein displaying comprising displaying the start image superposed with the first information during the booting or displaying the termination image superposed with the second information during the termination.

8. The method of claim 1, wherein the information comprises at least one of battery remainder, number of unchecked messages, call time, estimated call cost, memory state, morning call information, alarm information, anniversary information and schedule information, or any combination thereof.

9. A method of displaying information in a portable device, the method comprising:

obtaining information pertaining to functions of the portable device, the information comprising first information to be displayed during booting of the portable device and second information to be displayed during terminating of the portable device; and displaying the second information on a display unit during the terminating of the portable device, wherein the first and second information are preset by:

outputting a plurality of items corresponding to the functions of the portable device on the display unit;

selecting, via an input unit of the portable device, at least one item of the plurality of items to be set as the first information; and separately selecting, via the input unit, at least one item of the plurality of items to be set as the second information.

10. A portable device comprising:

an input unit which receives user input;

a controller which obtains information pertaining to functions of the portable device, the information comprising first information to be displayed during booting of the portable device and second information to be displayed during terminating of the portable device;

a display unit which displays, under control of the controller, the first information during the booting of the portable device;

wherein the first and second information are preset through controller operations of:

outputting a plurality of items corresponding to the functions of the portable device on the display unit;

detecting selection, via the input unit, of at least one item of the plurality of items to be set as the first information; and detecting separate selection, via the input unit, of at least one item of the plurality of items to be set as the second information.

11. The portable device of claim 10, wherein the controller further outputs the first information for a preset time period after the booting of the portable device is completed, detects selection of one of the outputted first information, and outputs a screen for checking the selected information on the display unit.

12. The portable device of claim 10, further comprising a storage unit that stores the information in a storage area accessible during the booting of the portable device.

13. The portable device of claim 12, wherein the storage unit stores information setting program that selectively configures the information.

14. The portable device of claim 10, wherein the controller controls updating of the information when performing the terminating of the portable device.

15. The portable device of claim 10, wherein the controller controls updating of the information periodically.

16. The portable device of claim 10, wherein the controller controls operations of converting and storing the information into one of image format and text format.

17. The portable device of claim 16, wherein the controller controls an operation of superposing the first information converted into one of image format and text format with a start image outputted when performing the booting or superposing the second information converted into one of image format and text format with a termination image outputted when performing the termination.

18. The portable device of claim 10, wherein the information comprises battery remainder, number of unchecked messages, call time, estimated call cost, memory state, morning call information, alarm information, anniversary information and a user's personal schedule information.

19. A portable device, comprising:

an input unit which receives user input;

a controller which obtains information pertaining to functions of the portable device, the information comprising first information to be displayed during booting of the portable device and second information to be displayed during terminating of the portable device;

a display unit which displays, under control of the controller, the second information during the terminating of the portable device;

wherein the first and second information are preset through controller operations of:

outputting a plurality of items corresponding to the functions of the portable device on the display unit;

detecting selection, via the input unit, of at least one item of the plurality of items to be set as the first information; and detecting separate selection, via the input unit, of at least one item of the plurality of items to be set as the second information.

\* \* \* \* \*